United States Patent [19]

Fujioka et al.

[11] Patent Number: 5,216,468
[45] Date of Patent: Jun. 1, 1993

[54] FLASH LAMP TYPE ILLUMINATING DEVICE FOR A COPIER WITH UNIFORM DISTRIBUTION

[75] Inventors: Tetsuya Fujioka, Yokohama; Kazuhiro Andoh, Tokyo, both of Japan

[73] Assignee: Ricoh Company, Ltd., Tokyo, Japan

[21] Appl. No.: 763,249

[22] Filed: Sep. 20, 1991

[30] Foreign Application Priority Data

| Sep. 21, 1990 [JP] | Japan | 2-98456[U] |
| Oct. 3, 1990 [JP] | Japan | 2-265640 |
| Oct. 5, 1990 [JP] | Japan | 2-268623 |

[51] Int. Cl.$^5$ .............................. G03G 15/04
[52] U.S. Cl. ...................... 355/229; 355/70
[58] Field of Search ............ 355/228, 229, 232, 233, 355/70, 66, 45, 43, 46; 362/3, 346, 328, 333

[56] References Cited

U.S. PATENT DOCUMENTS

| 3,732,004 | 5/1973 | Yamanoi et al. | 355/228 X |
| 4,110,040 | 8/1978 | Wittenberg et al. | 355/228 X |
| 4,350,433 | 9/1982 | Seto et al. | 355/228 X |
| 5,021,833 | 6/1991 | Kobayashi et al. | 355/228 |

*Primary Examiner*—Lincoln Donovan
*Assistant Examiner*—Christopher Horgan
*Attorney, Agent, or Firm*—Oblon, Spivak, McClelland, Maier & Neustadt

[57] ABSTRACT

An illuminating device incorporated in a copier for illuminating the entire image surface of a document laid on a glass platen by a plurality of flash lamps. The voltages to be applied to the flash lamps and, therefore, the quantities of light to issue from the lamps, are controlled to illuminate the image surface of a document in a uniform illuminance distribution. Even when use is made of a document having a fraction of another document adhered thereto, shadows ascribable to the edges of the fraction or patch do not appear.

10 Claims, 9 Drawing Sheets

Fig. 14

| NUMERAL | D₀ | D₁ | D₂ | - - - - | Dₙ | LAMP 34a VOLTAGE (V) | LAMPS 36a,38a VOLTAGE (V) |
|---|---|---|---|---|---|---|---|
| 0 | H | H | H | | H | 1000 | 100 |
| 1 | L | H | H | | H | 1050 | 105 |
| 2 | H | L | H | | H | 1100 | 110 |
| 3 | L | L | H | | H | 1150 | 115 |
| - - - | - - - | - - - | - - - | | - - - | - - - | - - - |

FLASH LAMP TYPE ILLUMINATING DEVICE FOR A COPIER WITH UNIFORM DISTRIBUTION

BACKGROUND OF THE INVENTION

The present invention relates to an illuminating device incorporated in a copier for illuminating the entire image surface of a document laid on a glass platen by a plurality of flash lamps.

An illuminating device for the above-described application usually has a single or a plurality of flash lamps. Documents usable with a copier include one having a fraction of another document, or patch, adhered thereto. This kind of document is thicker in the portion thereof where a patch exists than the other portion. Therefore, when a document with a patch is illuminated by a conventional illuminating device using flash lamps, the edges of the patch, i.e., the steps between the patch and the base of the document appear on a reproduction in a line pattern or a stripe pattern. In light of this, it has been customary to locate each flash lamp at a particular position for thereby eliminating the shadows ascribable to the edges of the patch. This implementation, however, increases the size of the illuminating device and, therefore, the overall size of the copier. Although a predetermined voltage is applied to the individual lamps so that they may emit light at the same time, it is difficult to set the quantities of light accurately. Moreover, since the degree of deterioration and the service life differs from one lamp to another, the quantities of light to issue from the lamps are brought out of balance due to aging, preventing a document from being uniformly illuminated.

SUMMARY OF THE INVENTION

It is, therefore, an object of the present invention to provide an illuminating device for a copier capable of illuminating the image surface of a document laid on a glass platen uniformly at all times by adjusting the quantities of light from flash lamps with ease.

It is another object of the present invention to provide a flash lamp type illuminating device for a copier which frees a reproduction of a document from undesirable shadows even when the document has a patch thereon.

It is another object of the present invention to provide a generally improved flash lamp type illuminating device for a copier.

A flash lamp type illuminating device incorporated in a copier for illuminating the entire image surface of a document laid on a glass platen of the present invention comprises a main flash lamp assembly disposed below the glass platen for directly illuminating the image surface of the document in a first direction, auxiliary flash lamp illuminating assemblies disposed below the glass platen and in different positions from the main flash lamp illuminating assembly for illuminating the image surface of the document in a second and a third direction, and a reflector for reflecting light from each auxiliary illuminating assembly to direct the resulting reflection to the image surface of the document in a fourth direction opposite to the first direction.

BRIEF DESCRIPTION OF THE DRAWINGS

The above and other objects, features and advantages of the present invention will become more apparent from the following detailed description taken with the accompanying drawings in which:

FIG. 14 lists a specific relation between numerical values and lamp voltages.

DESCRIPTION OF THE PREFERRED EMBODIMENT

Figure 1:
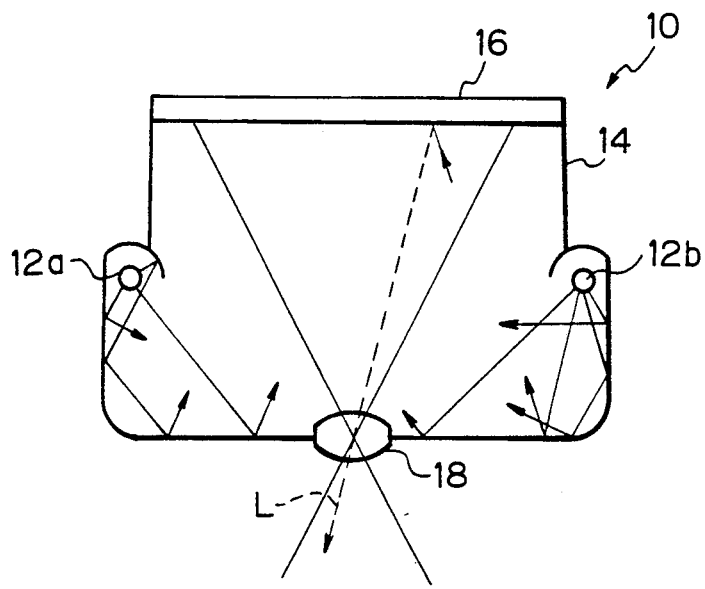
FIGS. 1 and 2 are sections each showing a specific arrangement of a conventional flash lamp type illuminating device.

To better understand the present invention, a brief reference will be made to a conventional illuminating device using flash lamps, shown in FIG. 1. As shown, the illuminating device, generally 10, has two flash lamps 12a and 12b. Light issuing from the flash lamps 12a and 12b is uniformly diffused in an illuminating box 14, and the diffused light illuminates a glass platen 16 of a copier in which the device 10 is incorporated. As a result, a document laid on the glass platen 16 is illuminated. A light image from the document is focused by a lens 18 onto a photoconductive element. When the document laid on the glass platen 16 has a fraction of another document, or patch, adhered thereto as stated earlier, the illuminating device 10 prevents the edges of the patch from appearing on a reproduction as lines or stripes. However, the problem with this device 10 using uniform diffused light is that light L directly reflected by the underside of the glass platen 16 is transmitted through the lens 18 to the photoconductive element, lowering the potential of the entire latent image to be formed on the photoconductive element. This adversely affects the tonality of a reproduction.

Figure 2:
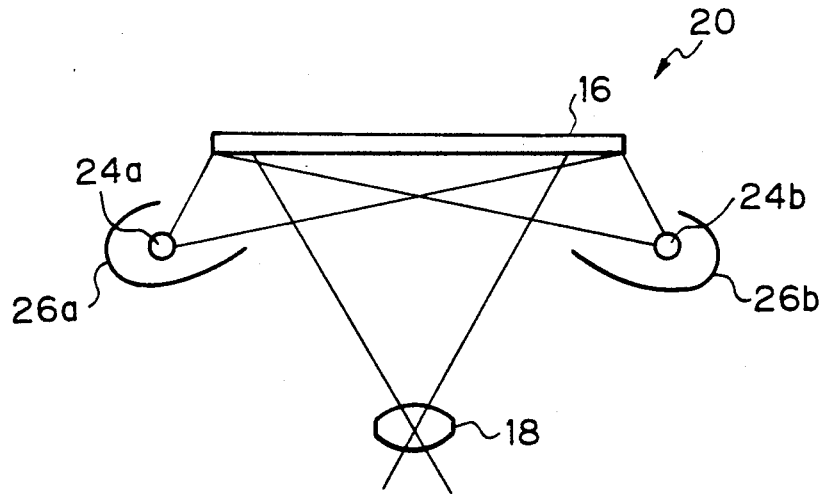

FIG. 2 shows another conventional illuminating device 20 which does not use diffused light. The illuminating device 20 has flash lamps 24a and 24b disposed below and at opposite sides of the glass platen 16. Such an implementation is also successful in preventing the edges of the patch on the document from appearing on a reproduction. In addition, the device 20 is free from direct reflections L particular to diffused light and, therefore, does not effect the tonality of a reproduction. Reflectors 26a and 26b are associated with the flash lamps 24a and 24b, respectively. However, the illuminating device 20 has a drawback that the device 20 and, therefore, the entire copier is bulky due to the inherent positions of the flash lamps 24a and 24b.

Figure 3:
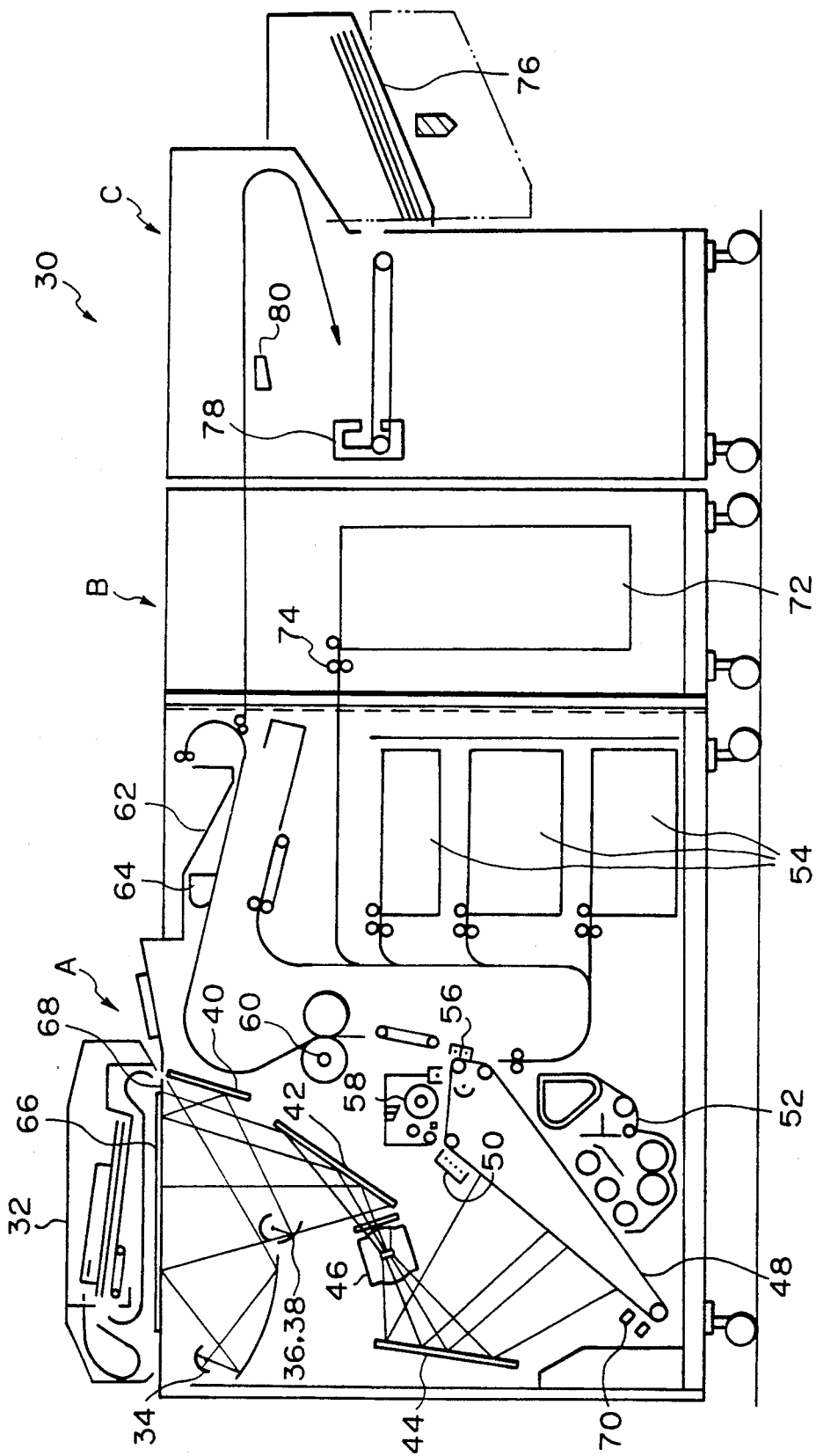
FIG. 3 is a section of a copier to which a flash lamp type illuminating device embodying the present invention is applied.

Referring to FIG. 3, a copier to which an illuminating device embodying the present invention is applicable is shown. As shown, the copier is generally made up of a copying section A, a mass sheet feeding section B, and a copy finishing section C.

The copying section A has an automatic document feeder (ADF) 32 for automatically feeding a plurality of documents to a predetermined position one by one. Optics has a main flash lamp assembly 34 constituting first illuminating means, a first and a second auxiliary flash lamp assembly 36 and 38 constituting second illuminating means, mirrors 40, 42 and 44, and a lens 46. A photoconductive belt 48 is exposed to imagewise information by the optics. A main charger 50 uniformly charges the surface of the belt 48 before exposure. A developing unit 52 develops a latent image electrostatically formed on the charged surface of the belt 48 by exposure. An image transfer unit 56 transfers the developed image to a sheet which is fed from a sheet feeding section 54. A cleaning unit 58 cleans the surface of the belt 48 after the sequence of copying steps to prepare it for another copying sequence or cycle. A fixing unit 60 fixes the image transferred from the belt 48 to the sheet. The sheet having the image fixed by the fixing unit 60 is driven out of the copier to a tray 62. A counter or similar detecting unit 62 is responsive to the number of such sheets, or copies, having been stacked on the tray 62. A reference density pattern 68 is provided on one end of the glass platen 66 and has a reference white density. A potential sensor 70 senses the potential of a latent image formed on the belt 48 and associated with the reference pattern 68.

The mass sheet feeding section B is constructed in the same manner as the sheet feeding section 54. Specifically, the mass sheet feeding section B has a storage 72 storing a number of sheets great enough to cope with mass consumption, and transporting means 74 for feeding such sheets from the storage 72 in synchronism with the image transfer timings of the copying section A.

The copy finishing section C has a stapler 78 for transporting the sheets undergone copying cycles at the copying section A to a predetermined tray 76, and a counter or similar detecting unit 80 for detecting the number of copies having been stacked on the tray 76.

Figure 4:
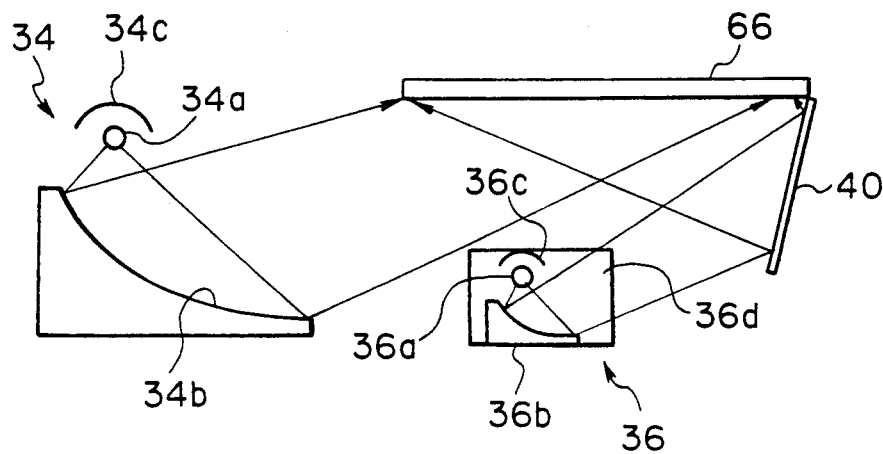
FIGS. 4 and 5 are views showing the illustrative embodiment.
Figure 5:
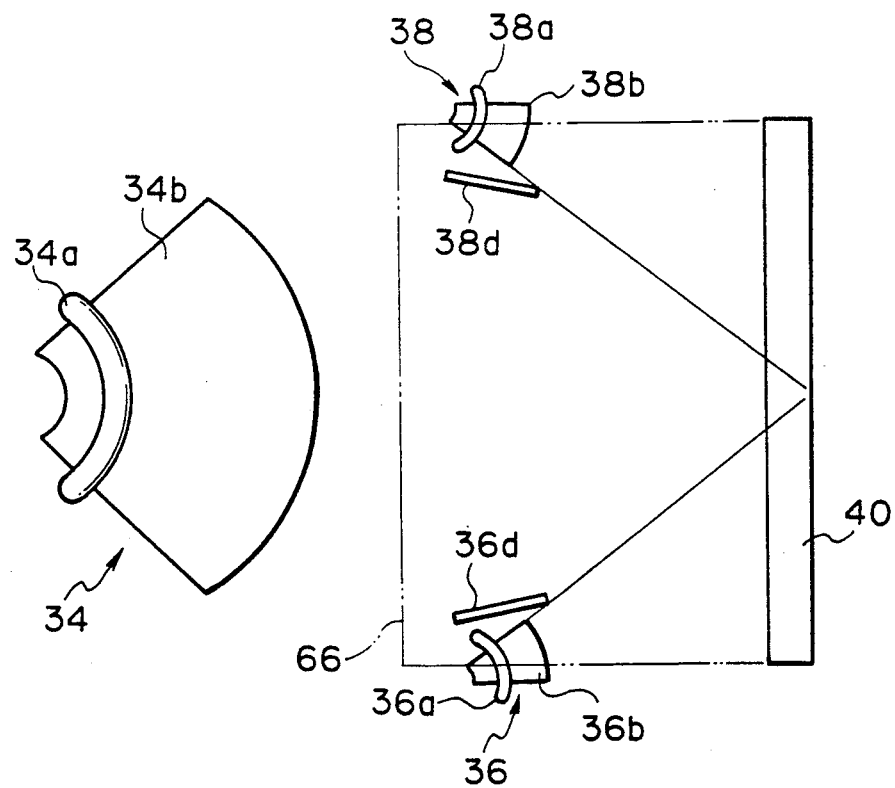
Figure 6:
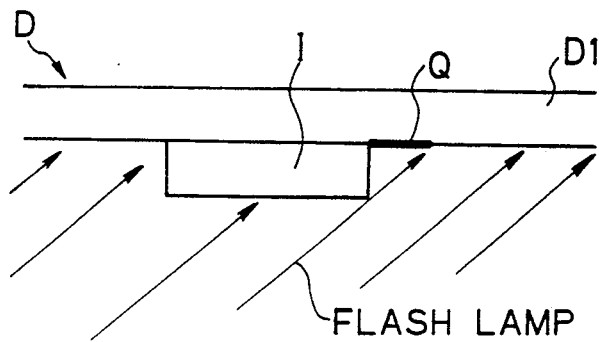
FIGS. 6 and 7 are views for describing a shadow particular to a document with a patch.

FIGS. 4 and 5 show the illuminating device of the present invention, i.e., the main flash lamp assembly 34 and the first and second auxiliary flash lamp assemblies 36 and 38. As shown, the main flash lamp assembly 34 has a flash lamp 34a. A mirror 34b controls light issuing from the flash lamp 34a with respect to the direction. The light from the mirror 34b illuminates a document laid on the glass platen 66 in a uniform illuminance distribution. Light directed upward from the flash lamp 34a is reflected by a shade 34c having an arcuate section, returned to the flash lamp 34a along the same optical path, and then transmitted through the flash lamp 34a to reach the glass platen 66 along the illumination path. However, with the main flash lamp assembly 34 only, the illuminating device would, as shown in FIG. 6, cast a shadow Q on the base sheet D₁ of a document D due to the thickness of a patch I adhered to the base sheet D₁. Such a shadow Q would appear on a reproduction as a black image. The first and second auxiliary flash lamp assemblies 36 and 38 are combined with the main flash lamp assembly 34 to eliminate such a shadow Q. Specifically, light reflected from a flash lamp 36a, which is included in the first auxiliary assembly 36, is reflected by a mirror 36b in a controlled direction and then reflected by the mirror 40 to illuminate a document laid on the glass platen 66 in a uniform illuminance distribution. Light directed upward from the flash lamp 36a is returned by a shade 36c having an arcuate section to the lamp 36a along the same optical path, and transmitted through the lamp 36a to reach the glass platen 66 along the illumination path. A screening plate 36a intercepts light directed sideways from the flash lamp 36a to thereby eliminate flares.

Likewise, the second auxiliary flash lamp assembly 38 has a flash lamp 38a. Light issuing from the flash lamp 38a is reflected by a mirror 38b in a controlled direction and then illuminates the document on the glass platen 66 in a uniform illuminance distribution. Light directed upward from the flash lamp 38a is reflected by a shade 38c having an arcuate section, returned to the lamp 38a along the same optical path, and then transmitted through the lamp 38a to reach the glass platen 66. A screening plate 38d is associated with the flash lamp 38a to intercept light directed sideways from the lamp 38a, thereby eliminating flares.

Figure 7:
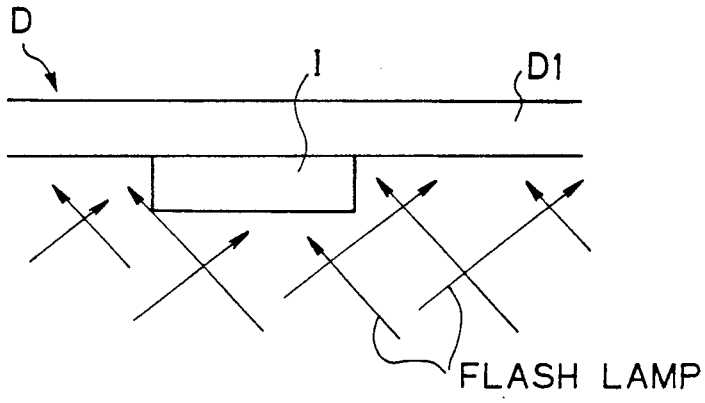

The flash lamp 34a of the main assembly 34 is an arcuate lamp having a radius of 75 millimeters and a center angle of 120 degrees. The mirror 34b also has a sectorial configuration whose center angle is 120 degrees. The flash lamps 36a and 36b of the auxiliary assemblies 36 and 38 are configured in substantially the same manner as the flash lamp 34a except that they have a center angle of 60 degrees. As shown in FIG. 5, the auxiliary flash lamp assemblies 36 and 38 are located at opposite sides of the glass platen 66 such that each illuminates one half of the glass platen 66. As shown in FIG. 7, the auxiliary flash lamp assemblies 36 and 38 illuminate the glass the document D from laterally opposite sides of the latter. As a result, the document D is free from the shadow Q shown in FIG. 6, insuring desirable image quality.

Figure 8:
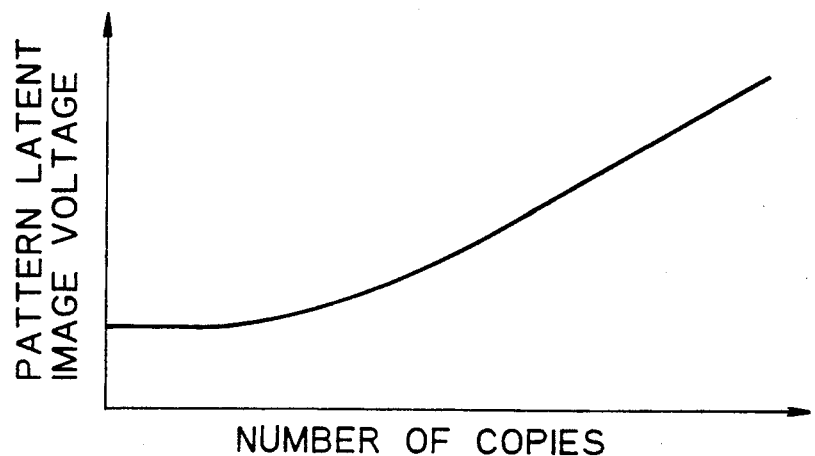
FIG. 8 shows a curve representative of a relation between the number of copies produced and the potential of a latent image associated with a reference density pattern.

Referring again to FIG. 3, the main and auxiliary flash lamps 34a, 36a and 38a illuminate the reference density pattern 68 of the glass platen 66 before illuminating a document laid on the glass platen 66. The resulting reflection from the reference density pattern 68 is routed through the mirror 42, lens 46 and mirror 44 to the photoconductive belt 48 to electrostatically from a corresponding latent image on the belt 48. The potential sensor senses the potential of the latent image representative of the reference density pattern 68. As FIG. 8 indicates, so long as the voltages applied to the flash lamps 34a, 36a and 38a are constant, the potential of the latent image sequentially increases with the increase in the number of copies produced due to the deterioration of the belt 48 and lamps. This in due course contaminates the background of a reproduction.

Figure 9:
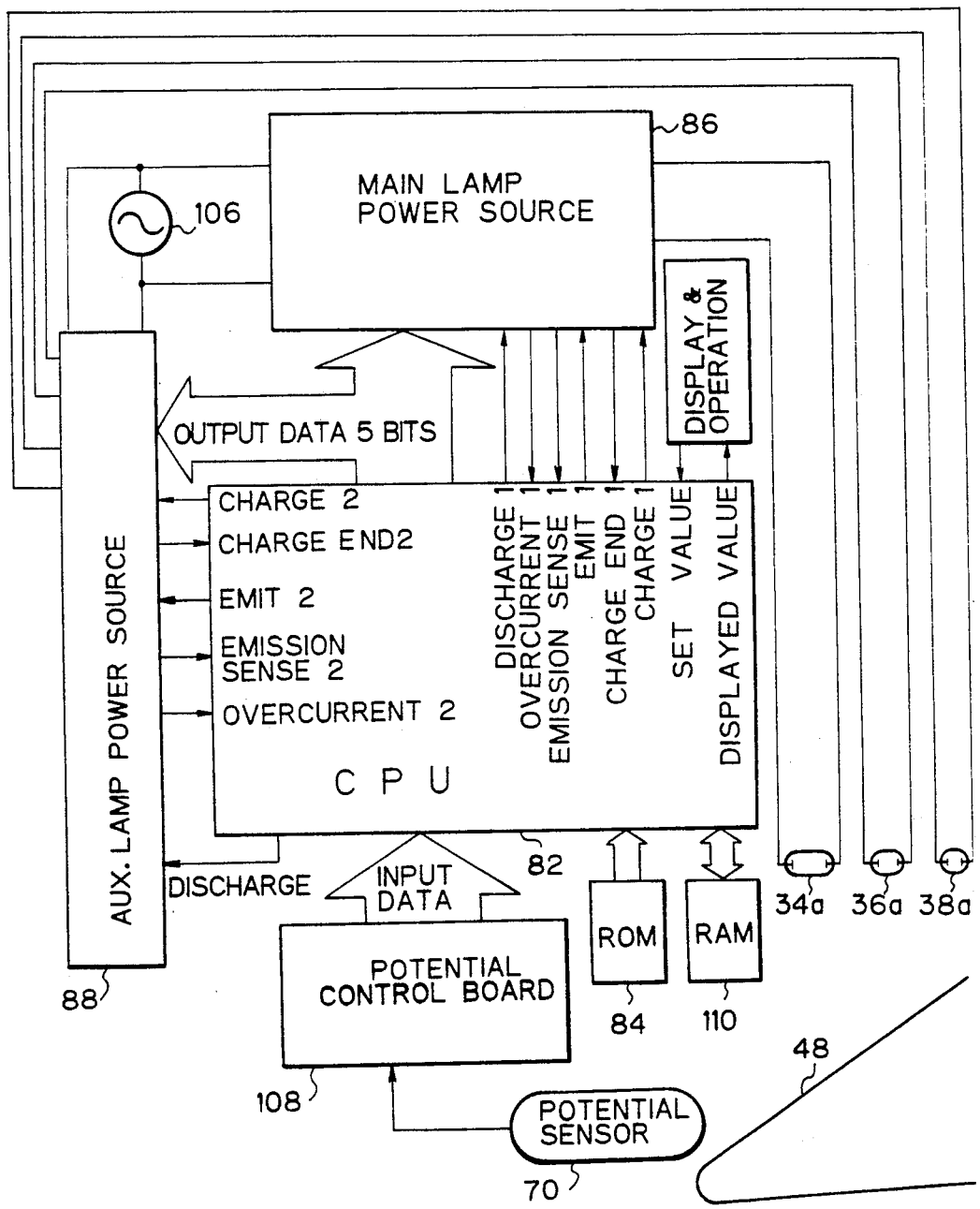
FIG. 9 is a block diagram schematically showing a control system included in the embodiment.
Figure 10:
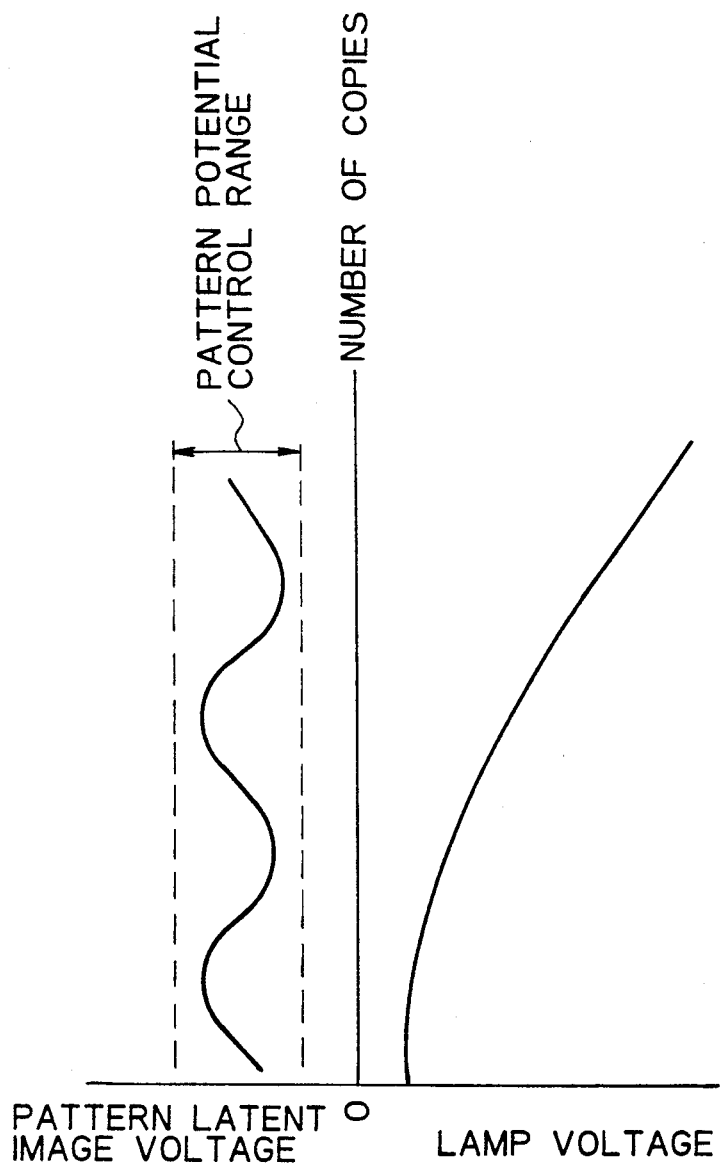
FIG. 10 shows curves showing a relation between the voltage in the event of lamp control and the number of copies produced.

Referring to FIG. 9, a control system capable of eliminating the contamination of the background of the above-mentioned nature is shown. As shown, the control system has a CPU 82 and a ROM (Read Only Memory) 84. The CPU 82 controls a main lamp power source 86 and an auxiliary lamp power source 88 on the basis of a particular program stored in the ROM 84, as shown in FIG. 10. Specifically, the CPU 82 controls the power sources 86 and 88 such that the potential of the pattern latent image lies in a pattern potential control range, FIG. 10. At this instant, the voltages applied to the individual flash lamps 34a, 36a and 38a are each so controlled as to increase and decrease with a voltage ratio determined by a method which will be described maintained constant, i.e., such voltages are so controlled to remain constant.

In practice, however, the degree of degradation and the service life differ from one flash lamp to another. Specifically, when only one of the flash lamps 34a, 36a and 38a is replaced with a fresh lamp, the quantity of light will differ from one lamp to another. Moreover, when reflectors, for example, are even slightly dislocated, the latent image to be formed on the belt 48 will differ from one copier to another and will vary due to aging. In light of this, the illustrative embodiment allows the voltages to be applied to the individual lamps to be adjusted.

Figure 11A:
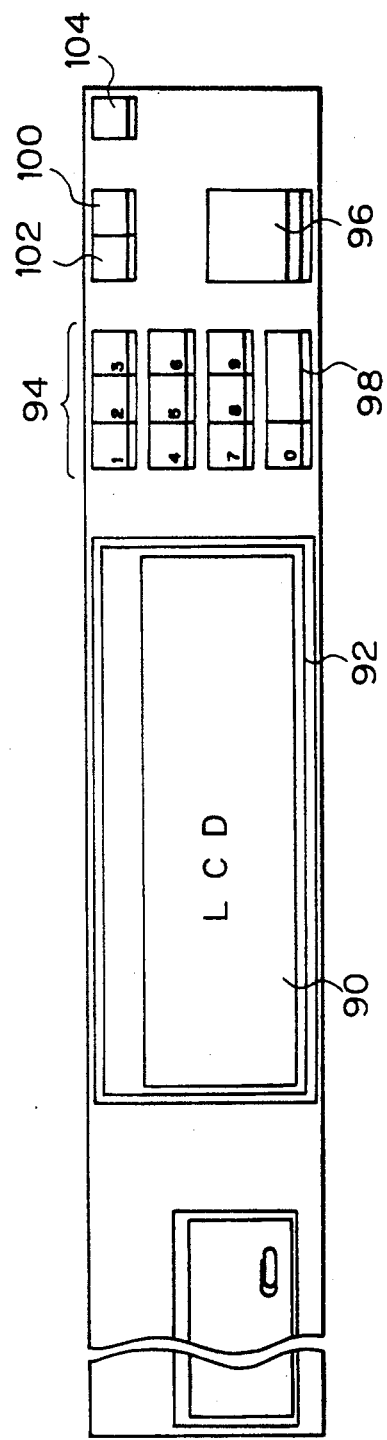
FIGS. 11A and 11B show a display and operation board also included in the embodiment.
Figure 11B:
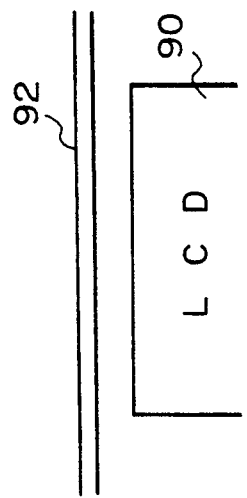
Figure 12:
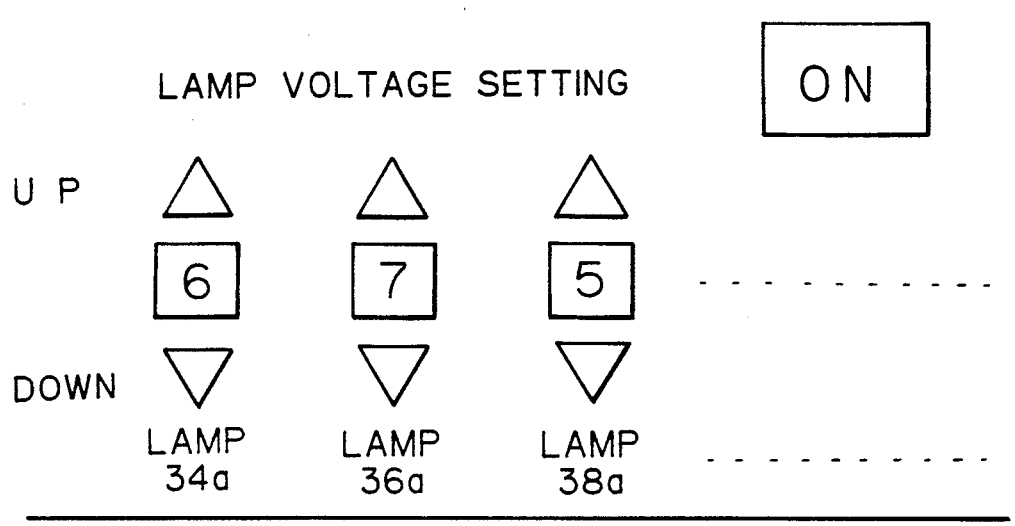
FIGS. 12 and 13 show a specific condition of the display and operation board for setting lamp voltages.

FIGS. 11A, 11B and 12 show a display and operation board which includes voltage setting means for the above-mentioned adjustment. As shown, the display and operation board has a liquid crystal display (LCD) 90 at the center thereof, and a transparent matrix touch switch panel 92 covering the LCD 90. When the switch panel 92 is pressed, the CPU 82 and ROM 84, FIG. 9, sense it. Since the LCD 90 is disposed below the switch panel 92, the operator can operate the switch panel 92 while watching a pattern appearing on the LCD 90. Also provided on the display and operation board are ordinary inputting means such as numeral keys 94, a copy start key 96, a clear/stop key 98, an interrupt key 100 usable to effect another job while a copying operation is under way, an enter key 102 for inputting data, and a mode clear key for clearing a copy mode and a preheat mode key 104 for setting up a preheat mode.

Figure 13:
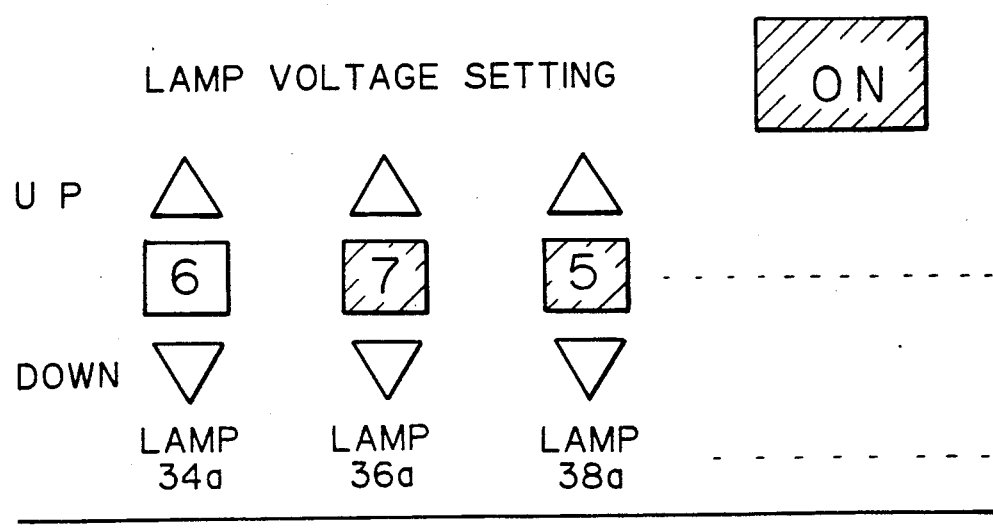

FIGS. 12 and 13 show a specific condition of the LCD 90 and matrix switch panel 92 which occurs in the event of voltage adjustment. Specifically, when the operator enters a particular numerical value on the numeral keys 94, a voltage setting pattern or picture appears on the LCD 90. Preferably, only the serviceman should know such a particular numerical value. FIG. 14 lists specific voltages corresponding to the numerals which may appear in the squares of FIGS. 12 and 13. In FIG. 14, the output data of the CPU 82 are labeled $D_o$-$D_n$. Triangular patterns are positioned above and below each square. As the operator presses either one of the triangular patterns associated with each square, the numerical value appearing in the square increases or decreases. The operator may turn on one or a plurality of lamps by pressing another square labeled ON in FIGS. 12 and 13 while pressing the square or squares where the numerical values are displayed. In FIG. 13, the hatching indicate the squares being pressed by the operator. In this specific condition, the flash lamps 36a and 38a are turned on by the voltages shown in FIG. 14 which correspond to the numerical values "7" and "5". In practice, the portions indicated by hatching are different in color from each other.

By setting the voltage lamp by lamp and causing each lamp to emit at the set voltage, it is possible to readily adjust the quantities of light at the production stage. Further, when the quantity of light differs from one lamp to another due to deterioration and the difference in service life, the voltages can be changed to set up a uniform light distribution. After the voltage adjustment, the potential of the latent image representative of the reference density pattern 68 is detected on the basis of the voltage ratio to thereby automatically adjust the voltages.

As shown in FIG. 9, the main lamp power source 86 and the auxiliary lamp power source 88 are respectively connected to the flash lamp 34a and the flash lamps 36a and 38a. A power source 106 feeds power to each of the lamp power sources 86 and 88. The lamp power sources 86 and 88 are connected to the CPU 82, so that their capacitors may be controllably charged and discharged. The CPU 82 sequentially applies lamp ON commands to the lamp power sources 86 and 88. In this sense, the CPU 82 also plays the role of means for controlling the emission of lamps 34a, 36a and 38a. In addition, the CPU 82 monitors emissions and overcurrents being sensed and representative of the instantaneous conditions of the power sources which depend on the presence/absence of light.

The surface potential of the belt 48 sensed by the potential sensor 70 is converted to a digital signal by a potential control board 108 and then applied to the CPU 82. In response, the CPU 82 sends digital signals representative of voltages to the lamp power sources 86 and 88 in order to set up adequate quantities of light. The relation between such output data of the CPU 82 and the lamp voltages is determined beforehand, as listed in FIG. 14 specifically. Instantaneous lamp voltages are written to the RAM 110 and sequentially updated.

The voltage setting means shown in FIGS. 11A-13 is also connected to the CPU 82. The CPU 82 processes the set data and writes them in a RAM 110. In the event of lamp adjustment, the CPU 82 recalls the data from the RAM 110 to send corresponding data to the lamp power sources 86 and 88, so that the lamps 34a-38a glow individually or in combination.

In summary, it will be seen that the present invention provides an illuminating device for a copier which is capable of illuminating a document laid on a glass platen in a uniform illuminance distribution by adjusting the quantities of light to issue from individual flash lamps.

Various modifications will become possible for those skilled in the art after receiving the teachings of the present disclosure without departing from the scope thereof.

What is claimed is:

1. A flash lamp type illuminating device for illuminating the entire image surface of a document laid on a glass platen, comprising:
   a main flash lamp illuminating means disposed below said glass platen and directing light upwardly to illuminate said document with a uniform illuminance distribution, said light from said main flash lamp having a component in a first direction which is parallel to said glass platen;
   an auxiliary flash lamp illuminating means disposed below said glass platen, said auxiliary flash lamp illuminating means comprising a first auxiliary lamp, a second auxiliary lamp, and a mirror;
   wherein light issues from said first auxiliary lamp in a second direction to impinge on said mirror;
   wherein light issues from said second auxiliary lamp in a third direction to impinge on said mirror; and
   wherein light from said first and second auxiliary lamps is directed by said mirror to illuminate said document in a uniform illuminance distribution, said light directed by said mirror having a component in a fourth direction which is opposite to said first direction.

2. A device as claimed in claim 1, wherein said main flash lamp illuminating means is disposed below said glass platen and in close proximity to a first edge of said platen in said first direction.

3. A device as claimed in claim 1, wherein said first and second auxiliary lamps are disposed below said glass platen and in close proximity to opposite edges of said glass platen in a direction perpendicular to said first direction.

4. A device as claimed in claim 1, further comprising voltage setting means for setting voltages to be applied to said main and auxiliary flash lamp illuminating means.

5. A device as claimed in claim 4, further comprising control means for controlling said voltage setting means to maintain the ratio between the voltages to be applied to said main and auxiliary flash lamp illuminating means constant.

6. An image forming device for forming an electrostatic latent image on a photoconductive member, said electrostatic latent image corresponding to an image printed on a document which is placed on a glass platen of the device, said image forming device comprising:
  a main flash lamp illuminating means disposed below said platen and directing light upwardly in a first direction to illuminate said document with a uniform illuminance distribution;
  an auxiliary flash lamp illuminating means disposed below said glass platen and directing light upwardly in another direction to illuminate said document with a uniform illuminance distribution;
  a reference density pattern provided on one end of said glass platen;
  a potential sensor for sensing the potential of a latent image formed on said photoconductive member by light reflected from said reference density pattern;
  means for controlling a first voltage supplied to said main flash lamp illuminating means and for controlling at least one voltage supplied to said auxiliary flash lamp illuminating means in response to the potential sensed by said potential sensor;
  means for maintaining an established ratio between said first and second voltages; and
  means for adjusting said established ratio to change a relative brightness among said main flash illuminating means and said auxiliary flash illuminating means.

7. An image forming device according to claim 6, wherein said auxiliary flash lamp illuminating means comprises first and second auxiliary lamps, wherein a second voltage is supplied to said first auxiliary lamp, and wherein a third voltage is supplied to said second auxiliary lamp.

8. An image forming device according to claim 6, wherein said means for adjusting said established ratio includes a switch on an operator switch panel.

9. An image forming device according to claim 7, further comprising a switch on an operator control panel for adjusting the voltage supplied to each of said first, second and third lamps.

10. A device according to claim 9, wherein said operator panel further includes switches operable to turn on each of said first, second and third lamps, and a display indicating the relative voltages supplied to said lamps.

* * * * *